July 23, 1935.  G. VINSON  2,009,305
PROTECTOR FOR INSECT POISON
Filed Aug. 23, 1934
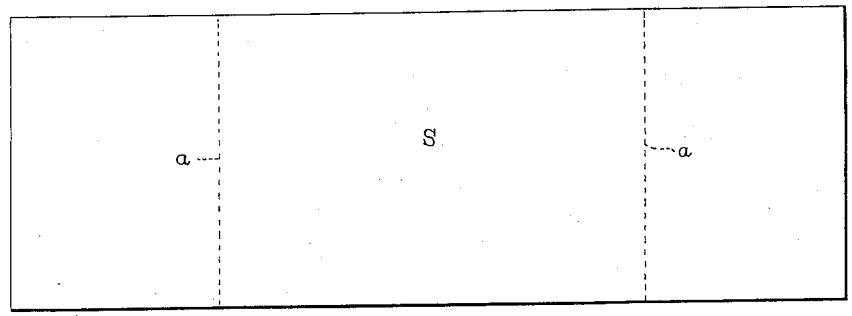
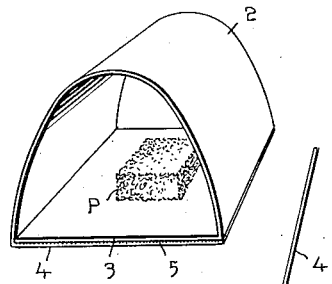
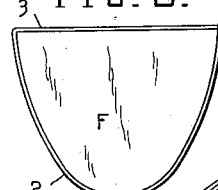
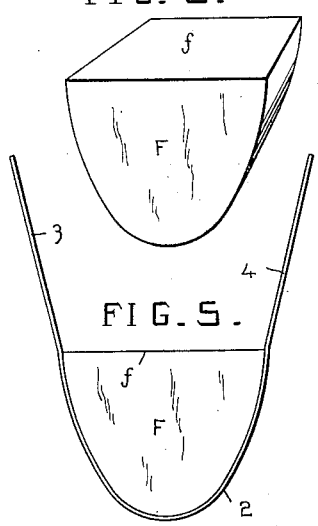
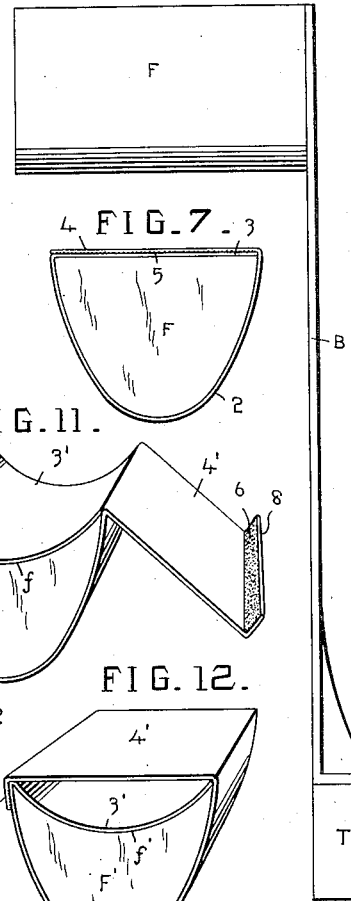
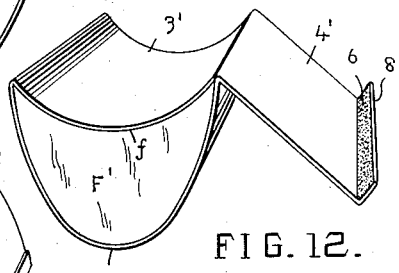
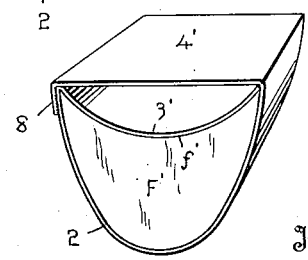
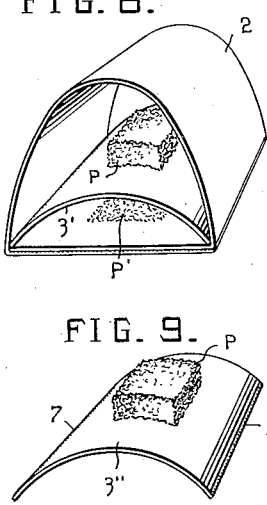

Patented July 23, 1935

2,009,305

UNITED STATES PATENT OFFICE 2,009,305

PROTECTOR FOR INSECT POISON

Guy Vinson, Miami, Fla.

Application August 23, 1934, Serial No. 741,142

4 Claims. (Cl. 42—131)

The present invention relates to the manufacture of holders and protectors for insect poison, and comprises improvements in the art or process of making them to insure uniformity in shape and size thereof, to facilitate ease and rapidity in construction, to reduce cost, and to produce a product which though constructed of light stock material, nevertheless, possesses strength and rigidity sufficient for the requirements of use. The invention further consists in improvements in the construction of the holder and protector as an article of manufacture whereby it is better adapted for its purposes than are like articles heretofore used, as will be hereinafter pointed out.

In the accompanying drawing—

Figure 1 indicates a sheet of material from which the holder to be described is manufactured.

Figure 2 is a side view of a shaping form used in manufacturing the holders.

Figure 3 is a perspective view of such form, detached.

Figure 4 is a perspective view of a holder and protector for insect poison of a form now well-known and in use.

Figures 5, 6 and 7 are views illustrating several successive steps in the manufacture of an article such as shown in Figure 4, according to the present invention.

Figure 8 is a perspective view of an insect poison holder and protector of improved form and construction.

Figure 9 is a perspective view of the supplemental or raised bottom shown in Figure 8, detached.

Figure 10 is a perspective view of a holder similar in most of its details to that illustrated in Figure 8, but made according to a different method.

Figures 11 and 12 are views in perspective, illustrating steps in the improved method of making an article like that shown in Figure 10.

In Figure 4 of the drawing there is shown an insect poison holder and protector of tunnel-like shape, which is now in common use and of which I am the originator.

It is formed, preferably, of paper stock, shaped to have an arched top 2 and a flat bottom composed of two superposed parts 3 and 4 united together by glue or other suitable adhesive 5. This holder is open-ended and to the inside face of the bottom thereof is secured a cake of insect poison P.

One of the objects of the present invention is to improve the method of making an article of the general type illustrated in Figure 4. In carrying out such method I make use of a shaping form F, such as represented in Figure 3. For convenience this form may be supported by bracket B from a table or bench T as represented in Figure 2.

In practicing the method of making an article such as shown in Figure 4, I first cut stock material, such as thin paper board, into sheets S, Figure 1, and score these along the lines a—a parallel to the ends of the blanks thus formed, making two end sections and a middle section, the latter being preferably somewhat longer than an end section. One of these blanks is then taken and its middle section is folded over or about the curved face of the form F, with the score lines a opposite the edges of the form where the flat face f and the sides of the curved portion meet. This step in operation is represented in Figure 5. The next step is to fold one of the end sections of the blank as 3, down flat against the face f of the form as represented in Figure 6. The other end section, 4, is then folded down upon the section 3 and secured thereto as by an adhesive 5. This step is represented in Figure 7. The complete and perfect adhesion of the two sections 3 and 4 forming the bottom of the holder, is insured by pressing these parts together while the holder is still upon the form, the pressure being applied by the hands of the operator or by a suitable tool adapted for that purpose. The complete holder may now be slipped from the form and is ready to have the cake of poison P applied thereto.

By the method described, the holder shown in Figure 4 may be quickly, easily and accurately formed and liability of the article being misshapen in manufacture, or the two sections of the blank constituting the bottom being in not the exactly desired superposed relationship and uniformly and completely united, are reduced to a minimum.

In Figure 8 is represented an insect poison holder and protector with a double bottom, the upper one 3′ being arched and separated from the flat bottom upon which the holder rests, by an open-ended air space. There are several advantages in this form of holder. The holders herein described are commonly used in the extermination of roaches, the poison employed being suitable for that purpose. As the holders for the poison are frequently used in damp and even wet places, where roaches are often most troublesome, it happens that the flat bottoms of the holders become water-soaked injuriously affecting the poison used and sometimes spoiling the holders themselves.

By constructing the holders with a supplemental arched bottom as represented in Figures 8 and 10, and supporting the poison cake P thereon, the latter is supported so as to be free from the deleterious effects of ground or floor moisture as there is a free open air space below such bottom. At the same time the holder as a whole is strengthened and does not get out of shape even should the flat bottom become water-soaked. Another advantage incident to this form of holder, is that it may serve as a carrier and protector for two different kinds of insect poisons. Thus upon the arched bottom 3″ may be supported a cake P of roach poison, and upon the flat bottom may be carried a different poison P′, as for instance one used in the extermination of ants.

In the making of the article shown in Figure 8, the supplemental bottom is formed of a separate piece of material, shown detached in Figure 9. The tunnel-shaped shell of the holder may be identically like that represented in Figure 4, and the supplemental bottom applied thereto by slipping it into place endwise through an open end of the holder. The supplemental bottom 3″ should be securely held in position as by means of adhesive 7 applied along the edges of the piece 3″.

The holder shown in Figure 10, while having the supplemental bottom feature in common with one like that shown in Figure 8, differs therefrom in that it is made from a single piece of stock material. The method of making it is illustrated in Figures 11 and 12. The shaping form, F′ used in the making of this style of holder has a curved base f′ instead of a flat base which is shown in Figure 3. The blank from which the holder is constructed differs from that shown in Figure 1, in that it has three cross score lines instead of two, and the two end sections 3′ and 4′ are not of the same length, the former, which constitutes the supplemental arched bottom, being the longer and the latter being preferably provided along its free edge with a narrow flange 8. In making this form of poison holder and protector, the midsection of the blank is bent around the arched face of the form F′ to form the arch shaped top 2 of the holder as in making the form represented in Figure 4 and already described. The longer end section 3′ is then folded down upon the curved face f′ of the form and shaped thereby as represented in Figure 11. Next, the end section 4′ is folded across the base of the shaping form from side edge to side edge and the narrow flange or flap 8 at the free edge of this section is folded against the outer face of the lower edge portion of one of the sides of the top 2, where it is secured as by adhesive 6. In this form of holder, the flat bottom which rests upon the floor or other supporting base is but of single thickness, instead of double thickness as in Figures 4 and 8, but as the supplemental bottom 3′ is separated from the flat bottom by an open air space, this is found sufficient in most instances.

It is found desirable making the holder according to the method just described, to secure the free edge of the supplemental bottom 3′, along the angle between the flat bottom 4′ and the top or cover 2, as by the use of adhesive material suitably applied.

It will be noticed that the arc of curvature of the supplemental bottoms 3′ in the forms of the invention illustrated in Figures 8 and 10 are struck on a much longer radius than that of the top or upper portion 2 of the holder.

Having described the invention, what is claimed is:

1. An open-ended insect poison holder and protector having an arched shaped top, a flat bottom and a supplemental bottom located between the top and the flat bottom and separated from the latter by a space open at its ends.

2. An open-ended insect poison holder and protector having an arch shaped top, a flat bottom and a supplemental bottom curved on an arc the radius of which is longer than the arc of the top, such bottom extending from side to side of the top and being located above the flat bottom and separated therefrom by a space open at its ends.

3. An article such as described in claim 2, where the supplemental bottom is formed of a separate piece of material inserted into the holder and there secured.

4. An article such as described in claim 2, where the material of the supplemental bottom is integral with the top and flat bottom of the article.

GUY VINSON.